May 13, 1930.  L. O. FRENCH  1,758,105
ELECTROMAGNETIC VALVE
Filed March 29, 1928
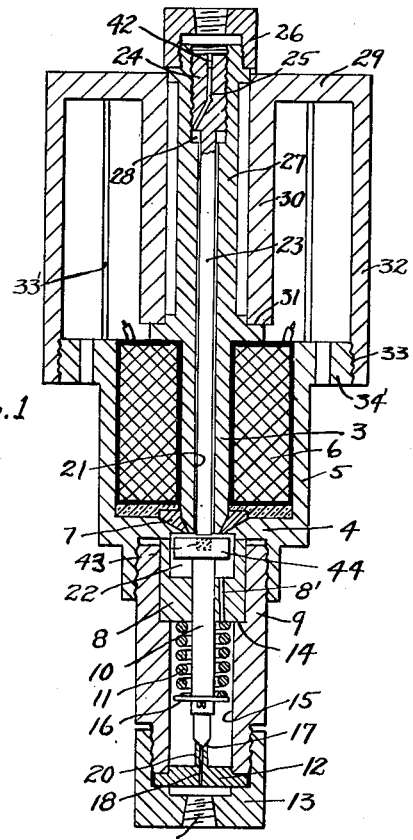
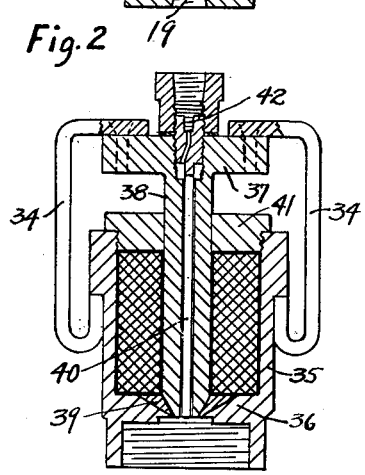
INVENTOR
Louis O. French Patented May 13, 1930

1,758,105

UNITED STATES PATENT OFFICE

LOUIS O. FRENCH, OF MILWAUKEE, WISCONSIN

ELECTROMAGNETIC VALVE

Application filed March 29, 1928. Serial No. 265,610.

The invention relates to electromagnetically-operated valves and more particularly a valve for controlling the metering of fuel to the cylinder or cylinders of an internal combustion engine.

In valves of the type above mentioned any tendency for the valve to clog, through foreign matter carried in the fuel, must be prevented as the proper metering will be interfered with if foreign matter gets in between the valve and its seat and holds the valve open. While it is usual to provide strainers in the fuel lines, the present invention aims to provide a further safeguard against a holding open of the valve, by making certain parts of the valve structure act as a strainer.

Fuel control valves for supplying fuel to small, high speed, internal combustion engines must be capable of operating at high speeds and in order to obtain a quick release of the armature after the current is cut off the tensioned valve-closing spring must be relatively strong so as to be ready to act quickly to overcome its own inertia and that of the valve. Where the current of the coil alone is used the current has to overcome this spring pressure as well as the fuel pressure tending to hold the valve closed. According to the present invention the permanent magnet of a polarized electromagnet is used to offset the spring pressure to a great extent so that the energizing coil only has to overcome the small difference in spring pressure remaining and any pressure of the fuel tending to close the valve. This enables one to greatly reduce the current necessary to operate the valve, thereby permitting the use of a smaller coil with a quicker and more sensitive action.

The invention further consists in the several features hereinafter set forth and more particularly defined by claims at the conclusion hereof.

In the drawings Fig. 1 is a vertical sectional view through an electromagnetic valve embodying the invention;

Fig. 2 is a similar detail sectional view showing certain modifications.

Referring to Fig. 1, the numeral 3 designates a centrally disposed, soft iron core, whose inner end forms the inner pole of the magnet, 4 the outer pole of soft iron or steel having an annular shell portion 5, 6 the energizing coil, 7 a gasket of nonmagnetic material interposed between the poles to provide a fluid-tight pole face therewith, 8 a casing member, preferably of non-magnetic material, 9 a clamping member in threaded engagement with the outer pole 4, 10 the control valve, 11 the valve-closing spring, 12 the valve seat member, and 13 a fitting clamping said member 12 to the member 9 by a threaded connection therewith.

The casing member 8 is here shown as clamped between the pole face at its upper end and a shoulder 14 on the member 9 which has a bore or passage 15 closed off at its outer end by the member 12. A passage 8' is provided in said member. The closing spring 11, interposed between the bottom face of member 8 and a washer 16 mounted on the stem of the valve, normally urges the needle valve 10 against the seat 17 having the discharge passage 18 leading therefrom to an opening 19 in the fitting 13 adapted to be connected by piping to a metering pump or to the engine cylinder or cylinders. The seat 17 is formed in an extension 20 that projects up from the bottom of the bore 15 and is of uniform diameter for a considerable distance from the seat 17 and is made as small a diameter as is practically possible so that the valve will have a minimum seating area. With this arrangement any foreign matter getting into the bore 15 will tend to collect at the bottom of said bore and will not get in between the seat and valve to hold the valve open. Furthermore, the seating area of the valve will never exceed the predetermined small area of this discharge extension, even if the seat wears or is ground down so that the uniformity of operation of the valve will not be altered and may be made to correspond with similar valves for other engine cylinders. The actual dimensions of the extension are much smaller than shown in the drawing but have been exaggerated for the purpose of a clearer showing.

The core 3 has a centrally disposed bore 21 through which the fuel passes to the chamber 22 formed by the casing member 8 and an adjustable stop-rod 23 extends through this bore and has its enlarged upper end 24 in adjustable threaded engagement with the enlarged threaded end of said bore, said end 24 having a passage 25 extending therethrough, communicating at its upper end with a pipe fitting connection 26 secured to the extended end 27 of the core and at its lower end with the space 28 which communicates with the annular channel formed between said rod and the bore 21. The diameter of the rod 23 is preferably so related to the diameter of the bore 5 that there is only a clearance of about a thousandth of an inch or less between the rod and bore so that if any foreign matter comes into the space from the fuel line it will be trapped at this point rather than between the valve and its seat so that the valve will not be held open by such matter.

A permanent magnet 29 has an annular pole portion 30 in abutting engagement at one end with an annular shoulder 31 on the core extension 27 and an annular pole portion 32 in threaded engagement at 33 with a flange 34' of the shell 5, this magnet being magnetized so that the inner pole 30 is of one polarity while the outer portion 32 is of the opposite polarity and being preferably of a strength to counteract a certain proportion, preferably the greater proportion, of the spring pressure so that the forces tending to close the valve are counteracted to a great extent by the magnetic force of this permanent magnet, whereby a smaller energizing coil 6 may be used, reducing the expenditure of electrical energy necessary to operate the valve and increasing the sensitiveness of operation. This magnet may have slots 33' formed therein to reduce inductive effects.

In place of a one-piece permanent magnet, the construction shown in Fig. 2 may be used wherein a series of radially arranged permanent bar magnets 34 are secured at their ends respectively to the shell 35 of the outer pole 36 and to a flanged extension 37 of the core 38, the other parts being similar to that previously described and including sealing gasket 39 and stop-rod 40. In this instance the bar magnets 34 act as clips to hold the core in operative relation with the outer pole member and the member 41 is of non-magnetic material, acting as a core-centering member. In each case the stop-rod has a screw slot 42 formed therein permitting it to be turned relative to the core to limit the lift of the control valve 10 by engaging a non-magnetic stop-block 43 set into the armature 44 on said valve.

With either of the above constructions the magnetic force of the permanent magnet serves to exert a magnetic field in the soft iron or steel poles, tending to attract the armature 44 toward them so that when the energizing current is passed through the energizing coil of the magnet the magnetic forces acting on the armature will then be of a strength to lift the valve against the forces tending to close it and allow fuel to pass through the passage 18.

I desire it to be understood that this invention is not to be limited to any particular form or arrangement of parts except in so far as such limitations are included in the claims.

What I claim as my invention is:

1. In an electromagnetic valve, the combination with an electromagnet, a valve chamber and a valve working in said chamber and actuated by said magnet, of an inlet passage to said chamber, and a stop member in said passage closely spaced relative to the wall of said passage to provide a filtering space to prevent the entrance of foreign matter into said chamber.

2. In an electromagnetic valve, the combination of a polarized attractive ironclad electromagnet provided with a fluid-tight pole face, of a valve-chamber adjacent said face, a valve working in said chamber and having an armature cooperating with said electromagnet, and means for normally closing the valve, the permanent magnet of said polarized electromagnet forming means opposing the force of said valve-closing means to reduce the forces necessary to open said valve.

3. In an electromagnetic valve, the combination of a polarized attractive electromagnet provided with a fluid-tight pole face, of a valve-chamber adjacent said face, a valve working in said chamber and having an armature cooperating with said electromagnet, and spring means for urging the valve to its closed position, the permanent magnet of said polarized electromagnet counteracting in part the closing force exerted by said spring means.

4. In an electromagnetic valve, the combination of a polarized attractive electromagnet, including an inner and outer pole, an electromagnet surrounding said inner pole, a permanent magnet having its poles in magnetically conductive association respectively with said inner and outer poles, said electromagnet having a fluid-tight pole face, a valve-chamber adjacent said face, a valve working in said chamber and having an armature cooperating with said electromagnet, and means opposing the magnetic force of the permanent magnet and normally urging said valve to its closed position.

5. In an electromagnetic valve, the combination of a permanent magnet having a central inner pole and an outer pole spaced from said inner pole and an electromagnet having a core associated with said central inner pole, an outer pole associated with said first-named outer pole and an energizing coil surrounding said core, said electromagnet having a fluid-tight pole face, a valve-chamber, and a valve working in said chamber and having an armature cooperating with the inner and outer poles of said electromagnet.

In testimony whereof, I affix my signature.

LOUIS O. FRENCH.